March 28, 1961 L. J. FAGEOL 2,976,836
VERTICAL SHAFT INBOARD MARINE POWER PLANT INSTALLATIONS
Filed May 24, 1956 3 Sheets-Sheet 1

INVENTOR
Louis J. Fageol

BY Strauch, Nolan & Neale
ATTORNEYS

March 28, 1961 L. J. FAGEOL 2,976,836
VERTICAL SHAFT INBOARD MARINE POWER PLANT INSTALLATIONS
Filed May 24, 1956 3 Sheets-Sheet 3

INVENTOR
Louis J. Fageol

BY Strauch, Nolan & Neale
ATTORNEYS

United States Patent Office 2,976,836
Patented Mar. 28, 1961

2,976,836
VERTICAL SHAFT INBOARD MARINE POWER PLANT INSTALLATIONS
Louis J. Fageol, Kent, Ohio
Filed May 24, 1956, Ser. No. 586,949
3 Claims. (Cl. 115—35)

This invention relates to an improved apparatus for mounting inboard power plants and propeller drives in boats, and more particularly to such mounting assemblies which provide a versatility of operation, ease of installation, and overall low cost, not heretofore obtainable with inboard powered hulls.

In recent years, because of the rapid increase in the popularity of small pleasure craft, much attention has been given to the development and refinement of power plants suitable for such boats. While the development of outboard installations has progressed rapidly, inboard installations have received little attention and have undergone little change. As a consequence, outboard installations have dominated the market and manufacturers of hulls have developed and produced on large scale hulls which are particularly adapted for outboard installations.

It is an important object of the present invention to provide installations for mounting power plants inboard, in hulls primarily designed to accommodate outboard engines, thus obtaining the cost advantages of the well designed, mass produced outboard hulls, while obtaining the advantages of increased power safety and quietness traditionally associated with inboard installations, and, at the same time, retaining the advantages of maximum space utilization and portability formerly obtainable only in outboard installations. Apart from savings on hull cost, all these advantages are also obtained when power plants are mounted in accordance with the present invention in hulls designed either for conventional inboard installations or hulls designed specifically to receive the mounting assemblies of the invention.

In its preferred form, the invention contemplates the mounting of the power plant and the propeller drive unit, as a unitary assembly in a ball and socket assembly affixed to the keelson or lower portion of the boat transom inside the boat. This permits rotation of the assembly for steering, tilting of the assembly to compensate for varying loads and weight distribution, and trimming for best planing characteristics of a given hull design to obtain maximum performance under widely varying conditions. While the basic advantages of rotating and tilting the power plant and drive assembly may also be accomplished by other means, the ball and socket is preferred because of its ease of operation and the simplicity of the required keelson sealing structure.

Preferably the power plant is positioned with the crankshaft axis extending substantially vertically, directly over the propeller drive assembly. Actual experience has demonstrated that this unique installation has the following additional important advantages over conventional installations:

(1) It permits installation of inboard power plants in production outboard hulls with little or no modification. The only modification ever required is an increase in keelson width in some cases to provide for the necessary mounting hole in the keel.

(2) Installation of an inboard power plant in an outboard hull may be made without increasing production line time. The entire power plant and propeller drive assembly may be installed in existing hulls, having a keel width of 4½" or greater in less than one hour, since special jigs and critical measurements are not required for satisfactory installation.

(3) Portability equal to outboard engines is achieved since after original installation, the entire power plant and propeller drive assembly may be removed and reinstalled in less than ten minutes.

(4) Adjustment of the propeller shaft angle is provided for by tilting the entire assembly, to obtain positive or negative lift at the transom to compensate for planing and hull design variations.

(5) The conventional stuffing box is eliminated, thus eliminating potential leaks and power loss. Since the power plant is directly aligned with the propeller drive assembly, the conventional inboard gear reduction box is also eliminated, thus further reducing power loss.

(6) Total space requirements are no greater than presently provided for with conventional "tilt-in" wells for outboard motors, thus effecting a substantial reduction in space requirements as compared to conventional inboard installations.

(7) Control of the boat is improved as compared with conventional inboard installations, since steering is effected by rotation of the power plant and propeller drive assembly, thus eliminating the separate rudder, rudder control and strut necessary in conventional inboard installations.

(8) Water intake for engine coolant is provided for through the ball joint assembly, thus eliminating the separate hole and bottom scoop type used on conventional inboards.

(9) Installation of dual power plants may be made in less space than is required by a conventional single inboard installation, and in space no greater than is required for dual "tilt-in" outboard motors, thus providing for ideal propeller spacing and the use of counter-rotating propellers when desired with no sacrifice of space.

Additional features and advantages will become apparent as the description proceeds in connection with the accompanying drawing in which:

Figure 4 is an enlarged fragmentary section showing details of the lower motor mount assembly;

Figure 5 is a top plan view of the lower mounting assembly, with the power plant and propeller drive assembly removed; and Figure 6 is a section taken along line 6—6 of Figure 4 showing the connection between the motor mount and the propeller drive.

Figure 1:
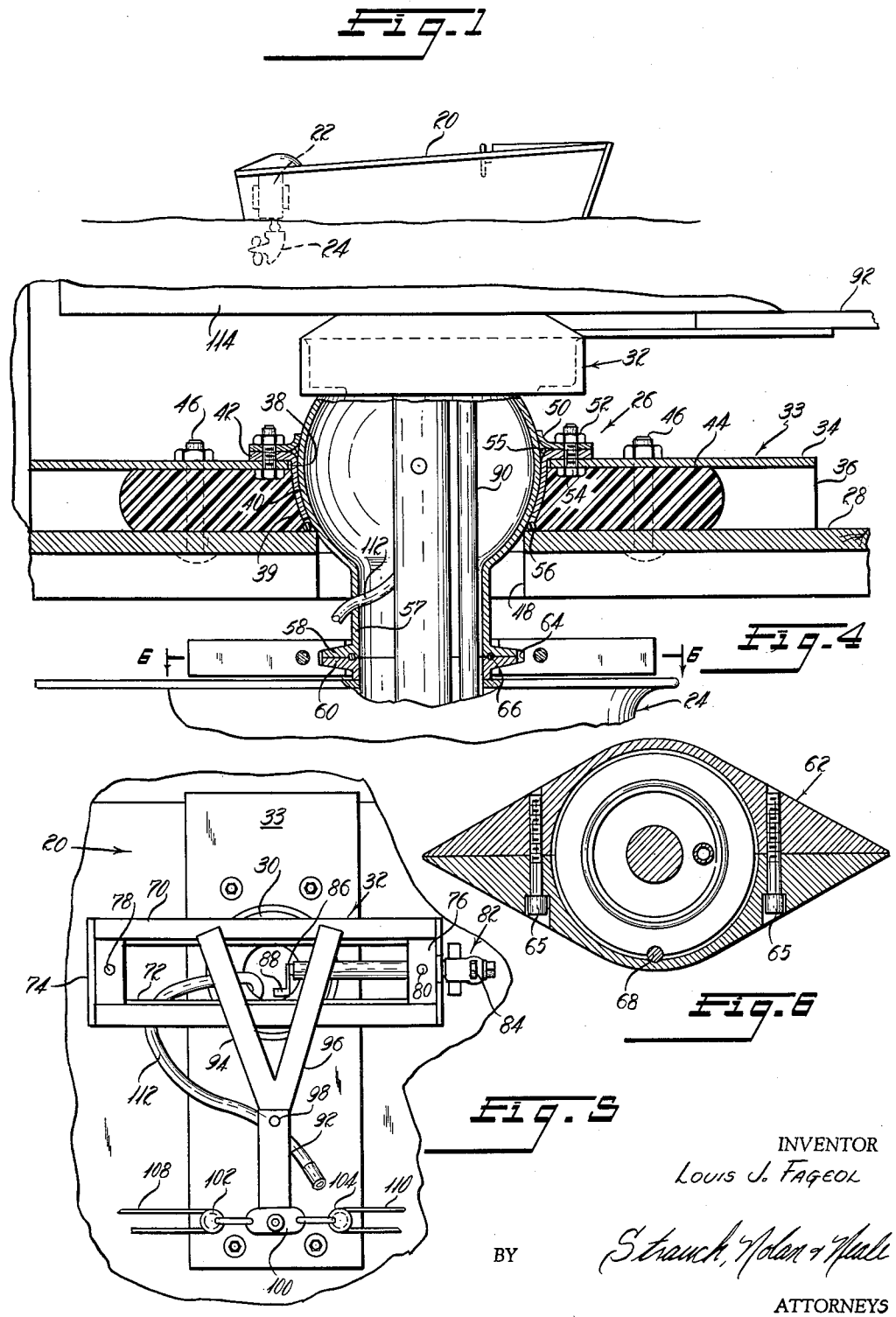
Figure 1 is a side elevation of a boat showing semi-diagrammatically the disposition of the power plant and propeller drive assembly in accordance with the present invention.

While, as stated above, the present invention is of general utility and may be used in connection with the installation of power plants in a variety of marine hulls, many of the advantages of the installation are most fully realized when the invention is utilized to install a power plant and propeller drive assembly in a standard outboard hull, of the type indicated at 20 in Figure 1. The power plant, indicated generally at 22 may advantageously be a single or multi-cylinder, four cycle water cooled internal combustion engine. However, present outboard vertical shaft powerheads of single or multiple cylinders may also be used. The engine is installed so as to dispose the axis of the crankshaft substantially perpendicular to the adjacent portion of the keel of the boat, preferably directly over the propeller drive assembly indicated generally at 24. This latter propeller drive assembly is preferably of a type widely used with conventional high power outboard motors, and includes gearing which is shiftable by dog clutch or other means between forward, neutral and reverse positions.

Figure 3:
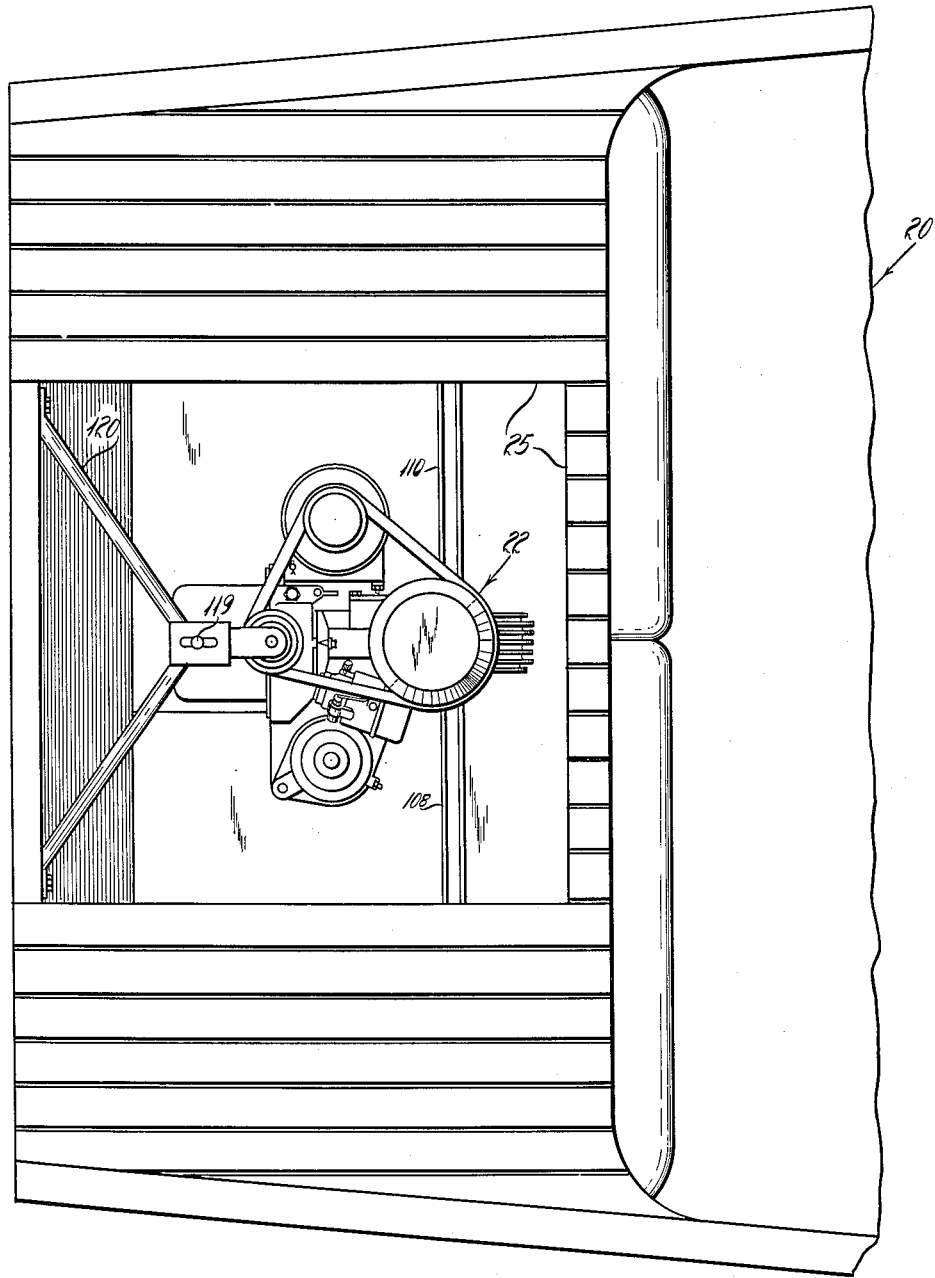
Figure 3 is a top plan view of the assembly shown in Figure 2.

It is a feature of the invention that the inboard installation of the present invention may be accomplished without sacrifice of usable space within the boat. This is bet illustrated in Figure 3 in which the power plant 22 is shown installed in the well 25 which is provided in the standard outboard hull to accommodate the conventional "tilt-in" outboard installation.

Figure 2:
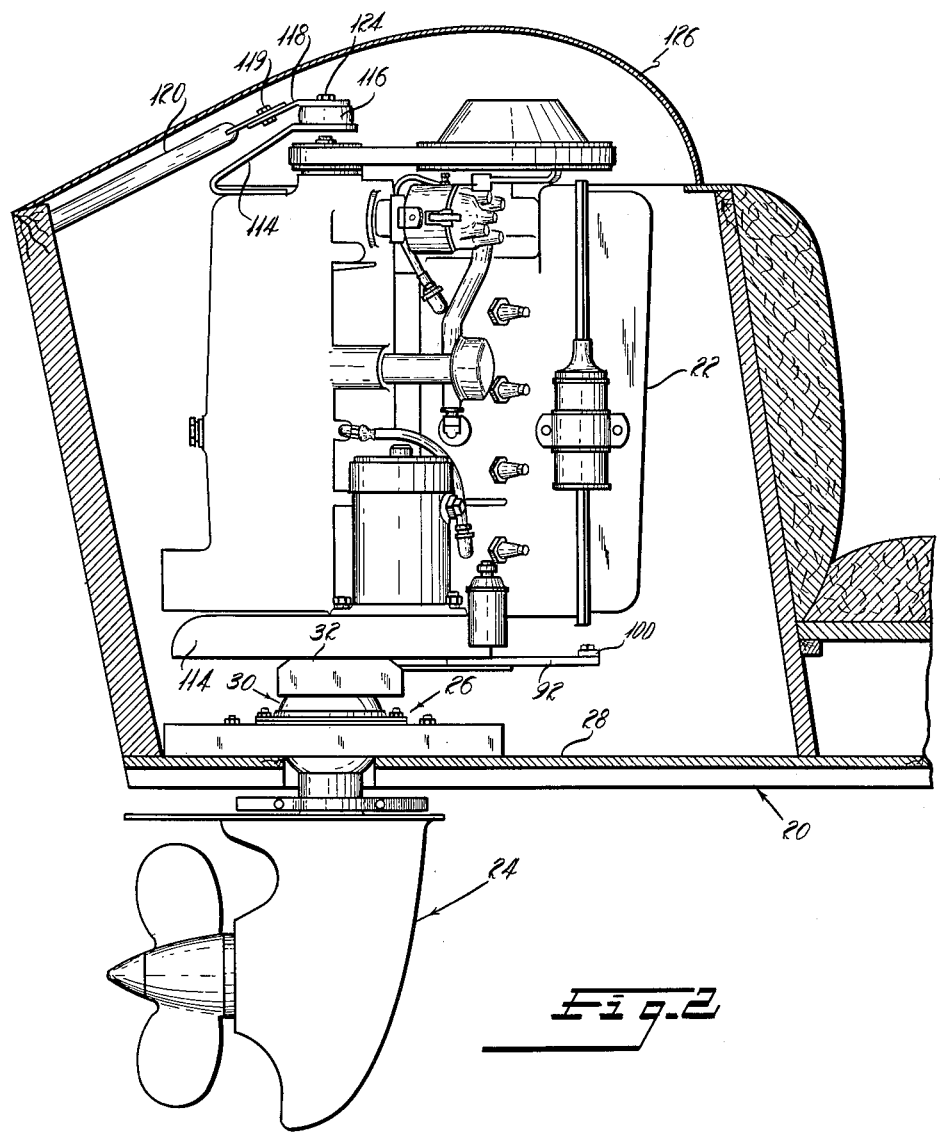
Figure 2 is an enlarged fragmentary view showing additional details of the assembly for mounting the power plant and propeller drive assembly in the position shown in Figure 1.

Referring now more particularly to Figures 2 and 4, the principal components of the mounting assembly are the socket assembly 26, secured to the keel 28 of the hull, a ball assembly 30 received in the socket assembly 26, and a frame assembly 32 rigidly secured to the upper surface of the ball assembly and adapted to be directly connected to the power plant.

The socket assembly 26 includes a channel 33 having a flat body portion 34 and downwardly or upwardly facing integral side flanges 36. The flat body portion 34 is provided with a central circular opening 38 through which a socket member 39 having a segmental spherical surface 40 extends. The member 39 is provided with a peripheral flange 42 preferably welded to the upper surface of the channel. The socket members may be secured in place by other means or may be formed integrally with the channel 33. A resilient shock and insulation panel 44 of rubber or similar elastic material is positioned under the channel 33 in surrounding relation with the socket member 39. When relaxed, the shock panel 44 is of greater thickness than the width of the channel side flanges 36. The assembly comprising the channel 33, socket 39 and shock pad 44, is rigidly secured to the keel 28 of the boat by a plurality of bolts 46 in a position to disposed the lower lip of the socket 39 in substantially exact alignment with a circular opening 48 which is cut through the floor and keel of the hull. The cutting of the opening 48 is the only consequential modification of a standard hull required to accommodate the installation of the present invention.

When the socket assembly 26 is in place, the ball assembly 30 carrying the frame assembly 32 is installed and held in place by a retainer ring 50, which is rigidly secured after assembly of the ball unit by a plurality of nuts 52 threaded on bolts 54 which extend upwardly through the channel body 34 and the socket flange 42. O-rings 55 and 56 encircle the ball assembly adjacent the joint between the flange 42 and retainer ring 50 and at the lower end of the socket 39, to provide a low cost, low friction, reliable seal at this point.

The ball assembly 30 is formed integrally at its lower end with a cylindrical neck portion 57, the diameter of which is less than the diameter of the opening 48 in the keel. At its lower end the neck portion 57 is provided with a flange 58 having a flat lower surface and an inclined upper surface. A similar annular flange 60 is formed at the upper end of the propeller drive housing 24. The respective flanges 58 and 60 are detachably secured together by a split clamping ring 62 which has a tapered inwardly facing groove 64 adapted to secure the flanges 58 and 60 together with a wedge action. The clamp halves are secured together by bolts 65. A sealing O-ring 66 is compressed between the flanges 58 and 60 to form a water tight joint. Preferably a pin 68 is mounted in the clamping groove 64, which is received in notches in the periphery of the flanges 58 and 60 to prevent relative rotation of the upper and lower mating parts.

As best shown in Figure 5, the frame assembly 32 includes a pair of angle irons 70 and 72, preferably welded, bolted, cast integrally with, or otherwise rigidly secured to the upper rim of the ball assembly 30. At their opposite ends, the angle irons 70 and 72 are joined by cross members 74 and 76, carrying respective upwardly projecting studs 78 and 80. A throttle and transmission control assembly indicated generally at 82, is secured to the end member 76. The control assembly 82, which is more fully described and claimed in Patent No. 2,808,733, includes a lever 84 non-rotatably secured at one end of a shaft 86, the opposite end of which carries a crank 88, adapted to be connected to the upper end of the transmission control shaft 90, (Figure 4) which projects upwardly through the mounting assembly. The control assembly may be operated electrically or by flexible cables so that its operation is not affected by tilting or swivelling movement of the frame assembly 32.

A Y-shaped operating assembly, comprising three straps 92, 94 and 96, welded together, is welded to the upper surface of the angle irons 70 and 72, and at the junction of straps 94 and 96 carries an upwardly projecting motor mount stud 98. At its free end, the strap 92 pivotally carries a cross member 100 to which pulleys 102 and 104 are attached. The usual steering control cables 108 and 110 pass over the respective pulleys 102 and 104, the rear span of each of the cables being spring mounted on the sides of the hull, and the forward span leading to the tiller or steering wheel. It will be apparent that operation of the cables 108 and 110 will swing the entire mounting assembly about the axis of the ball member 30. Other commonly used types of steering controls, such as gear and sector, etc., may also be used advantageously when connected to the tiller arm. The lower mounting assembly is completed by the installation of a water intake conduit 112, which passes under the angle iron 72, the strap 92, into the interior of the ball assembly 30, and at its lower end passes through the wall of the neck portion 57 of the ball assembly, so that it is in communication with the exterior of the boat.

The power plant may be installed on the frame assembly 32 in a matter of minutes, by slipping the appropriate openings in the bell housing 114 of the power plant over the mounting studs 78, 80 and 98, and securely bolting the bell housing in place. To facilitate assembly, one of the studs, for example stud 78, is preferably made longer than the remaining studs. After connection of the carburetor controls, a suitable flexible exhaust conduit, not shown, and connections of flexible fuel lines, the power plant is ready for operation.

The exact disposition of the motor axis is determined by adjustment of the upper motor mount, which comprises a bracket 114 rigidly secured to the upper end of the power plant, a resilient shock mount 116 which supports a slotted bracket 118 adjustably secured by a bolt and nut assembly 119 to a Y-shaped bracket 120, mounted on the transom 122. The axis of the power plant may be positioned as desired between the limit positions shown in dotted lines in Figure 2, by loosening attaching bolt 119, moving the power plant to the desired position, and re-tightening the bolt. It will be noted that the axis of the bolt 124, which connects the strap 118 to the upper end of the power plant, coincides closely with the axis of the ball assembly 30, so that the entire power plant and propeller drive assembly are mounted for free co-movement about the axis of bolt 124 and the axis of the ball assembly 30.

Operation of the steering control cables 108 and 110 will pivot the frame assembly 32, the entire power plant, the ball assembly and the propeller drive assembly about the axis of the ball assembly, thereby changing the direction of thrust to steer the boat without the use of rudders and associated mechanisms previously used in all known inboard installations.

Further, the adjustment provided at the upper motor mount permits fore and aft tilting of the entire assembly to change the angle of the propeller shaft as desired to obtain positive, negative or zero lift at the transom, to permit trimming of the boat to compensate for varying loads and weight distribution to thereby obtain maximum performance under widely varying conditions.

The installation is completed by assembly of a sheet metal cover plate 126 which is ornamental and protective and conceals the entire power plant assembly.

From the foregoing it will be apparent that the above stated objects of the invention have been obtained by the provision of improved inboard power plant installations which are of inexpensive durable construction, which may be utilized in hulls designed for outboard or inboard power plants, and which permit optimum hull performance.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A motorboat comprising a boat hull having an opening in the bottom thereof, a power plant, a mount assembly, a frame at one end of said mount assembly, means detachably securing one end of said power plant to said frame, a socket assembly mounted in the floor of said boat adjacent said opening, a shock mount interposed between said socket assembly and the floor of said boat hull, a ball assembly carrying said mount assembly and received in said socket for universal movement therein, a propeller drive assembly, means on said ball assembly projecting through said opening for supporting said propeller drive assembly below the bottom of said boat whereby said power plant and said propeller drive assembly are connected for co-movement by said ball assembly, a pivot assembly connected to the power plant at its upper end and to said boat hull, means for adjustably positioning said pivot assembly to thereby adjust the angular disposition of said power plant and said propeller drive assembly with respect to said boat hull, and a yoke construction rigid with said frame and projecting outwardly a substantial distance from the axis of said socket assembly adapted to be connected to steering cables for swinging said power plant and said propeller drive assembly about the axis of said pivot assembly and said socket assembly.

2. Apparatus for mounting a power plant and a propeller drive assembly to be driven thereby in a boat hull, bottom wall and the like, comprising a resilient pad surrounding an opening in said wall, a socket overlying the pad and fastened to said wall with said pad, a ball housing rotatably received in said socket comprising a hollow ball terminating downwardly in a flanged tubular portion for water tight connection to said propeller drive assembly, a seal about said ball, a retainer ring for the seal and ball to retain the ball normally rotatable in the socket, a frame rigidly mounted on the ball for attachment to the power plant, an arm for attachment to the hull and pivotally to the power plant at its axis to maintain said plant with substantially no sidewise motion and means to adjust said arm for positioning said plant in fore and aft direction.

3. Apparatus for mounting a power plant and a propeller drive assembly to be driven thereby in a boat hull, bottom wall and the like, comprising a resilient pad surrounding an opening in said wall, a socket overlying the pad and fastened to said wall with said pad, a ball housing rotatably received in said socket comprising a hollow ball terminating downwardly in a flanged tubular portion for water tight connection to said propeller drive assembly, a seal about said ball, a retainer ring for the seal and ball to retain the ball normally rotatable in the socket, a frame rigidly mounted on the ball for attachment to the power plant, an arm for attachment to the hull and pivotally to the power plant at its axis to maintain said plant with substantially no sidewise motion and means to adjust said arm for positioning said plant in fore and aft direction, and steering mechanism attached to said frame to rotate the power plant, ball housing and propeller assembly as a unit.

References Cited in the file of this patent
UNITED STATES PATENTS

| 625,412 | Pashley | May 23, 1899 |
| 1,866,482 | Olsen | July 5, 1932 |
| 2,378,589 | Slack et al. | June 19, 1945 |

FOREIGN PATENTS

| 341,918 | Germany | Feb. 17, 1921 |